(12) United States Patent
Bazri et al.

(10) Patent No.: US 10,821,419 B2
(45) Date of Patent: Nov. 3, 2020

(54) FILTER APPARATUS FOR THE TREATMENT OF HYDROCARBON CONTAMINATED WATER

(71) Applicant: DONMARK HOLDINGS INC., Delta (CA)

(72) Inventors: Mohammad Mahdi Bazri, Delta (CA); Sona Moradi, Delta (CA); Mark Toeckes, Delta (CA); Earl Trautman, Delta (CA)

(*) Notice: Subject to any disclaimer, the term of this patent is extended or adjusted under 35 U.S.C. 154(b) by 215 days.

(21) Appl. No.: 15/907,015

(22) Filed: Feb. 27, 2018

(65) Prior Publication Data

US 2018/0280931 A1 Oct. 4, 2018

Related U.S. Application Data

(60) Provisional application No. 62/464,768, filed on Feb. 28, 2017.

(51) Int. Cl.
*C02F 1/28* (2006.01)
*B01D 17/022* (2006.01)
(Continued)

(52) U.S. Cl.
CPC .... *B01J 20/28035* (2013.01); *B01D 17/0202* (2013.01); *B01D 17/085* (2013.01);
(Continued)

(58) Field of Classification Search
CPC .......... C02F 1/001; C02F 1/281; C02F 1/283; C02F 1/285; C02F 1/288; C02F 1/40;
(Continued)

(56) References Cited

U.S. PATENT DOCUMENTS 4,039,489 A 8/1977 Fletcher et al.
4,302,337 A * 11/1981 Larson ............... B01D 17/0202
210/287

(Continued)

FOREIGN PATENT DOCUMENTS

| CA | 2358983 | 7/2000 |
| CA | 2400505 | 8/2001 |
| CA | 2678275 | 8/2001 |

*Primary Examiner* — Matthew O Savage

(57) ABSTRACT

A filter apparatus for treating hydrocarbon contaminated water comprising a housing defining an internal cavity and having an inlet and an outlet; a separating member that separates the internal cavity into a first treatment zone and a second treatment zone, wherein the first treatment zone is in fluid communication with the inlet and the second treatment zone is in fluid communication with the outlet, the separating member having one or more holes therethrough for fluid flow from the first treatment zone to the second treatment zone; at least one distribution tube within the second treatment zone having an end enclosing at least one of the holes to accept liquid flowing through the hole, the distribution tube further having perforations along its length for distributing liquid into the second treatment zone; a filtration barrier within the first treatment zone for removing particulate matter from the liquid flowing therethrough; and a particulate filtration media within the second treatment zone, surrounding the distribution tube, comprising at least one polymer for removing hydrocarbons from the water flowing through the second treatment zone prior to exiting the outlet.

19 Claims, 6 Drawing Sheets

(51) Int. Cl.

| | | |
|---|---|---|
| *B01J 20/28* | (2006.01) | |
| *C02F 1/40* | (2006.01) | |
| *B01D 17/02* | (2006.01) | |
| *B01J 20/26* | (2006.01) | |
| *B01J 20/20* | (2006.01) | |
| *B01D 17/00* | (2006.01) | |
| *C02F 1/00* | (2006.01) | |
| *C01B 32/30* | (2017.01) | |
| *C02F 101/32* | (2006.01) | |
| *C02F 103/00* | (2006.01) | |
| *B01D 39/20* | (2006.01) | |
| *B01D 29/56* | (2006.01) | |

(52) U.S. Cl.
CPC .............. *B01J 20/20* (2013.01); *B01J 20/26* (2013.01); *C02F 1/001* (2013.01); *C02F 1/281* (2013.01); *C02F 1/283* (2013.01); *C02F 1/285* (2013.01); *C02F 1/40* (2013.01); *B01D 29/56* (2013.01); *B01D 39/2062* (2013.01); *C01B 32/30* (2017.08); *C02F 2101/32* (2013.01); *C02F 2103/001* (2013.01); *C02F 2201/006* (2013.01)

(58) Field of Classification Search
CPC ............ C02F 2101/32; C02F 2103/001; C02F 2201/006; B01D 17/085; B01D 17/0202; B01D 24/10; B01D 24/04; B01D 27/02; B01D 27/146; B01D 29/56; B01D 39/3062; B01J 20/20; B01J 20/26; B01J 20/28035; C01B 32/30
USPC ........................................ 210/266, 283, 289
See application file for complete search history.

(56) References Cited

U.S. PATENT DOCUMENTS

| | | | |
|---|---|---|---|
| 4,759,847 A * | 7/1988 | Medbury | ............... B01D 15/00 210/484 |
| 5,328,598 A * | 7/1994 | Lohrl | ................. B01D 17/0202 210/93 |
| 5,511,904 A | 4/1996 | Van Egmond | |
| 5,662,801 A | 9/1997 | Holland | |
| 5,767,060 A | 6/1998 | Hanraham | |
| 5,820,762 A | 10/1998 | Bamer et al. | |
| 6,080,307 A | 6/2000 | Morris et al. | |
| 6,485,639 B1 | 11/2002 | Gannon et al. | |
| 6,503,390 B1 | 1/2003 | Gannon | |
| 6,841,077 B2 | 1/2005 | Gannon et al. | |
| 8,137,564 B2 | 3/2012 | Gannon | |
| 8,974,662 B2 | 3/2015 | Gannon | |
| 8,986,822 B2 | 3/2015 | Gupta et al. | |
| 2005/0230302 A1* | 10/2005 | Muir | .................... B01D 24/008 210/290 |

* cited by examiner

FILTER APPARATUS FOR THE TREATMENT OF HYDROCARBON CONTAMINATED WATER

BACKGROUND OF THE INVENTION

Field of the Invention

The present invention relates to filter apparatus and filtration media for treating hydrocarbon contaminated water resulting from varying sources, including for example, run-off water from parking lots, wastewater from industrial applications, hydrocarbon spills in containment areas for electrical transformers or oil tanks, and other sources of hydrocarbon contaminated water.

Description of Related Art

There are many sources of hydrocarbon contaminated water and it is increasingly important under increasing environmental scrutiny to effectively remove the hydrocarbon from the water prior to discharging the water into the environment. The difficulty is not just handling the hydrocarbons but separating it efficiently and economically from a large quantity of water. Often the hydrocarbon contaminated water also includes other debris and sediment which can clog passive filtering devices. Thus, it would be desirable to first filter out the debris and sediment prior to treating the hydrocarbon contaminated water to prevent the apparatus from becoming clogged by the debris and sediment. It would also be desirable for the apparatus to have a relatively high liquid flow rate to enable higher volumes of hydrocarbon contaminated water may be treated per unit of time.

SUMMARY OF THE INVENTION

In some aspects, the present invention provides a filter apparatus for treating hydrocarbon contaminated water comprising: a housing defining an internal cavity and having an inlet and an outlet; a separating member within the internal cavity that separates the internal cavity into a first treatment zone and a second treatment zone, wherein the first treatment zone is in fluid communication with the inlet and the second treatment zone is in fluid communication with the outlet, the separating member having one or more holes therethrough for fluid communication between the first treatment zone and the second treatment zone; at least one distribution tube within the second treatment zone having an end in fluid communication with at least one of said one or more holes through the separating member to accept liquid flowing through said at least one of said one or more holes, the at least one distribution tube further having a plurality of perforations along its length for distributing liquid flowing through the at least one distribution tube into the second treatment zone; a filtration barrier within the first treatment zone for removing particulate matter from the liquid flowing through the first treatment zone; and a particulate filtration media within the second treatment zone and surrounding the at least one distribution tube, and comprising at least one polymer for removing hydrocarbons from the water flowing through the second treatment zone prior to exiting the outlet.

In some embodiments of the apparatus, the at least one distribution tube may include a closed end opposite the end in fluid communication with said at least one of said one or more holes.

In some embodiments, the apparatus may further comprise a first water permeable membrane between the second treatment zone and the separating member to prevent particles of the particulate filtration media from clogging any open holes in the separating member. In some embodiments, the apparatus may further comprise a second water permeable membrane between the second treatment zone and the outlet to prevent particles of the particulate filtration media from clogging the outlet.

In some embodiments, the particulate filtration media may further comprise particles of activated carbon. In some embodiments, the particulate filtration media may further comprise a bonding agent to reinforce bonding between particles of the at least one polymer and the activated carbon, and among particles of the at least one polymer.

In some embodiments, the at least one polymer may be selected from the group consisting of styrene, butadiene, ethylene, butylene molecules and their hydrogenated structures with various molecular weights in diblock, triblock alternating forms and any other combination thereof in the form of linear, branched, radial molecular structure and any other combination thereof.

In some embodiments, the at least one polymer may be selected from the group consisting of styrene-butadiene-styrene (SBS), styrene-ethylene-butylene-styrene (SEBS), their hydrogenated derivatives such as styrene-ethylene-propylene (SEP), and combinations thereof.

In some embodiments, the average particle size of the activate carbon may be about 6-25 mesh and the average particle size of the at least one polymer may be about 4-35 mesh.

In some embodiments, the apparatus may comprise a third treatment zone defined in the internal cavity between the second treatment zone and the outlet, the third treatment zone having a secondary particulate filtration media therein comprising at least one secondary polymer for removing hydrocarbons left behind in the liquid after passing through the second treatment zone.

In some embodiments, the secondary particulate filtration media may differ in one or more of physical properties, chemical properties, and proportions of constituents from the particulate filtration media within the second treatment zone. In some embodiments, second water permeable membrane may be provided separating the second treatment zone from the third treatment zone.

In some embodiments, a third second water permeable membrane may be provided between the third treatment zone and the outlet to prevent particles of the secondary particulate filtration media from clogging the outlet. In some embodiments, the secondary particulate filtration media may further comprise particles of one or more adsorbents selected from the group consisting of activated carbon, clay and zeolite.

BRIEF DESCRIPTION OF THE DRAWINGS

Specific embodiments of the invention will now be described, by way of example only, with the use of drawings in which.

DESCRIPTION OF THE PREFERRED EMBODIMENTS

Figure 1:
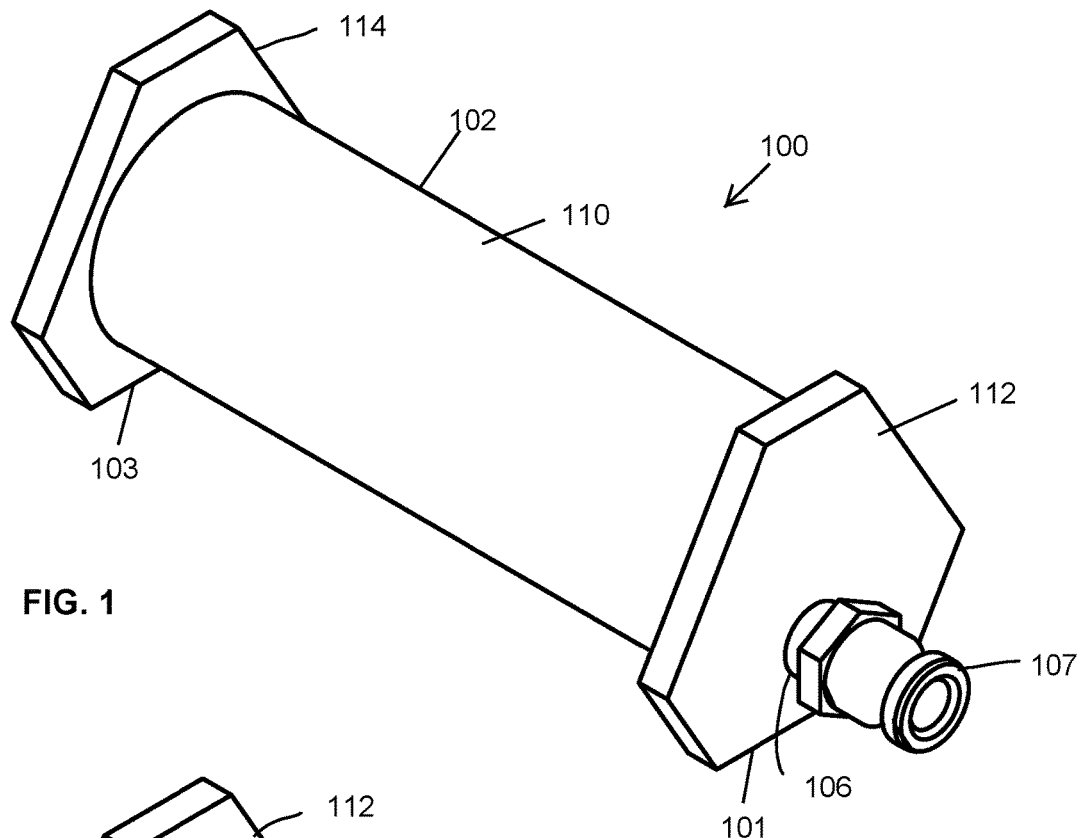
FIG. 1. is a perspective view of a filter apparatus in accordance with an embodiment of the present invention, showing the inlet end.
Figure 2:
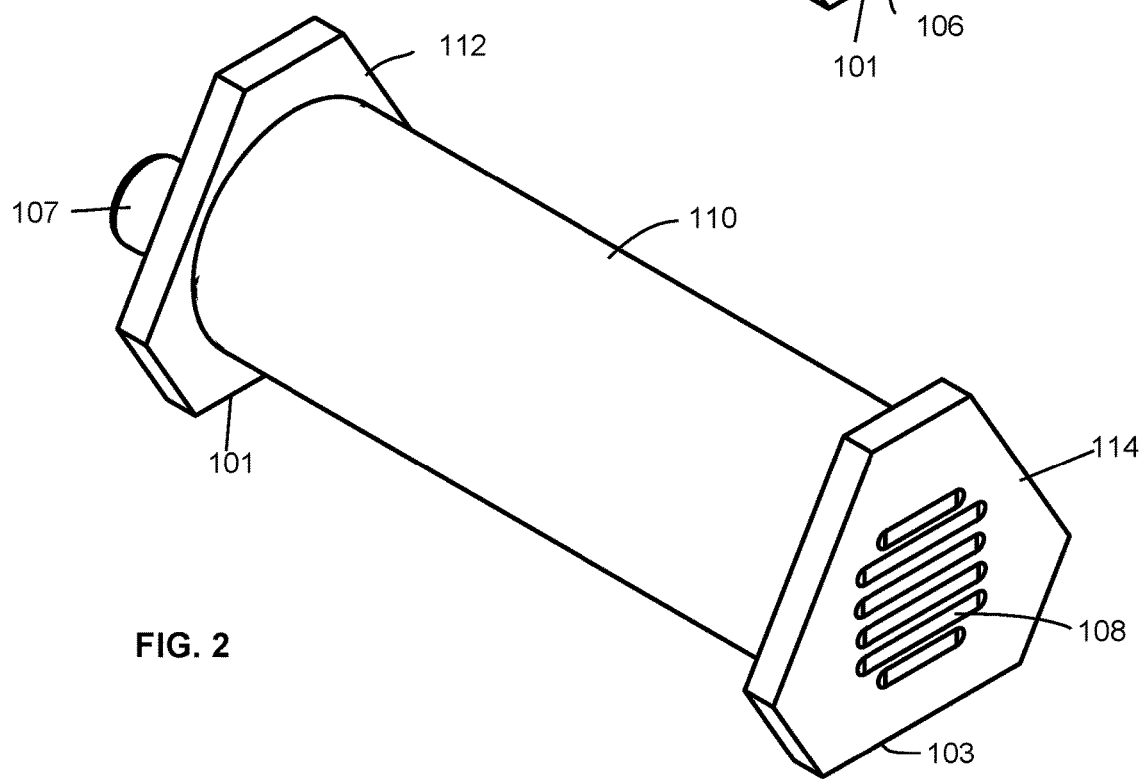
FIG. 2. is a perspective view of the filter apparatus shown in FIG. 1, showing the outlet end.
Figure 3:
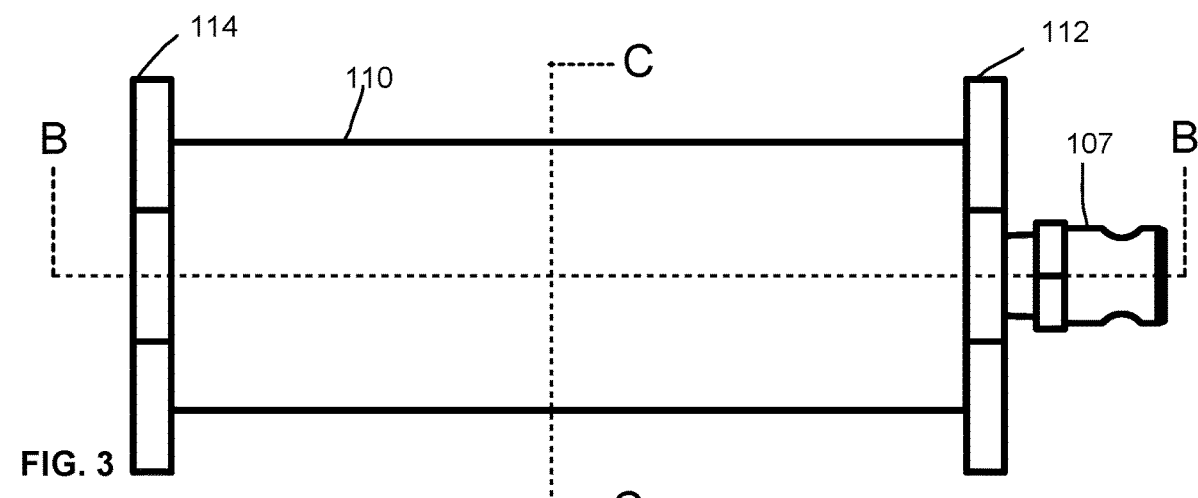
FIG. 3. the top plan view of the filter apparatus shown in FIG. 1.
Figure 4:
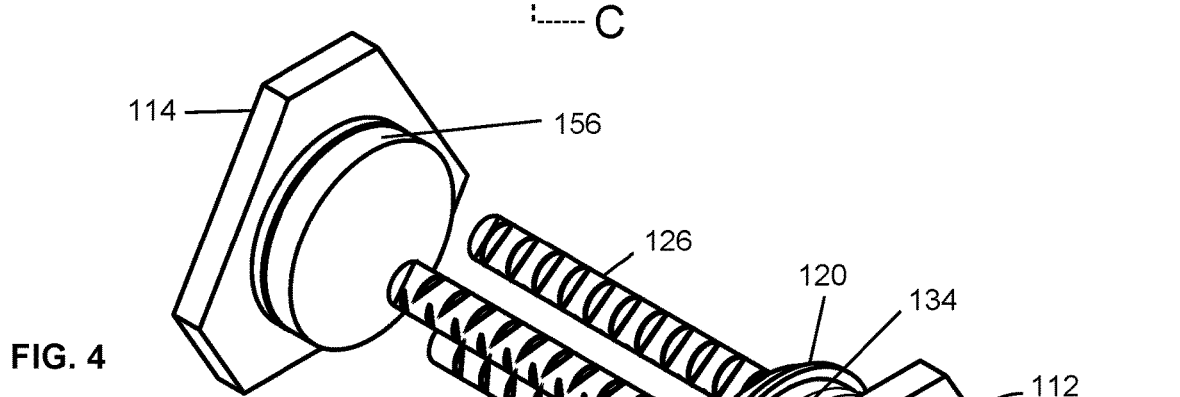
FIG. 4. is a perspective view of the internal structure shown from the inlet end of the filter apparatus in FIG. 1.

Referring to FIGS. 1-22, filter apparatus in accordance with the present invention are shown generally at 100. Filter 100 comprises a liquid tight housing 102 defining an internal cavity 104 and having an inlet 106 at one end of the housing 102 and an outlet 108 at an opposite and of the housing 102. The inlet 106, the internal cavity 104 and the outlet 108 are in fluid communication. A hose connector 107 is shown connected to the inlet 106, and such connector may be integral to the filter or separate (as shown in the illustrated embodiment) from the filter 100.

The housing 102 may be unitary, or as in the illustrated embodiments, it may comprise of subcomponents such as for example, elongate tubular or cylindrical member 110, end plate 112 enclosing one end of cylindrical member 110 and defining the inlet 106, and end plate 114 enclosing the other end of cylindrical member 110 and defining outlet 108. The outlet 108 may comprise several parallel slots as illustrated, but the outlet 108 may be of varying shapes and may communicate with another conduit depending on the application of the filter.

In order to stabilize the filtration device and limit its ability to roll on the ground or other surfaces, the end plates 112 and 114 may be a polygonal shape that defines several straight support edges 101 and 103. Other shapes for the end plates are contemplated which provide similar straight support edges, and in embodiments with a unitary housing, the housing itself may include structural features that provide an analogous stabilizing effect.

The internal cavity 104 is separated into a first treatment zone 116 and a second treatment zone 118 by a separating member such as distribution disk member 120 that is orthogonal to the longitudinal axis of the cylindrical member 110. The first treatment zone 116 is adjacent the inlet 106 and is thus upstream from the second treatment zone 118. The separating member such as disk member 120 includes a plurality of holes 122 that span its thickness to allow liquid flow therethrough from the first treatment zone 116 into the second treatment zone 118.

The separating member such as disk member 120 may be dimensioned to conform to the internal cross-sectional dimensions of the cavity 104 so that its peripheral edges abut the internal wall of the housing 102, or its peripheral edges may be configured to accommodate an O-ring or other elastomeric sealing member, which abuts the internal wall of housing to provide a water-tight seal. In some embodiments, the separating member such as disk member 120 may be dimensioned slightly smaller to allow some liquid bypass between its peripheral edges and the internal wall of the housing 102 in embodiments requiring a higher liquid flow rate. Or as illustrated, the disk member 120 can be stepped on both sides to accommodate and couple cylindrical subcomponents 111 and 113 into the cylindrical member 110 and thereby divide the filter into the first and second treatment zones.

One or more distribution tubes 126 are connected to the disk member 120 at one or more holes 122 and extend into the second treatment zone 118. Thus, an end of a distribution tube 126 circumscribes or encloses, hence is in fluid communication with, one of the plurality of holes 122 such that liquid passing through such surrounded hole 122 flows through the enclosing distribution tube 126. In some embodiments, all holes 122 may each communicate with a tube 126 such that all liquid flowing through the holes 122 flows through the tubes 126, whereas in other embodiments some of the holes 122 may remain uncovered and some of the holes may be enclosed by a tube 126.

Referring to FIGS. 9-12, each tube 126 includes a plurality of perforations 128 in its wall along its length, and a remote end 130 that is opposite to the end connected to the disk member 120. The remote end 130 of the tubes 126 is preferably closed so that all liquid flowing into the tube via disc number 120 must exit via the perforations 128. The tubes 126 may be any cross-sectional shape, such as round, triangular, square, polygonal, and the like. And the perforations 128 may comprise holes (as in FIG. 12), slits (as in FIGS. 9-11) or other openings in the wall of the tubes that allow liquid flow out of the tube along its length. In the illustrated embodiment of the tubes shown in FIGS. 9-12, the plurality of slots 128 in each tube 126 are located on opposite sides of the tube and are staggered with respect to each other. Each slot 128 is sized to maximize the liquid flow exiting to 126 while at the same time substantially preventing particles of the filtration media 148 from falling into and clogging the tube. The cross-sectional diameter of the tubes may, for example, be about ⅜" to about 1" for typical filters in the size range of 3' to about 7" in cross-sectional diameter; however, in larger filters the tubes may be larger.

Figure 5:
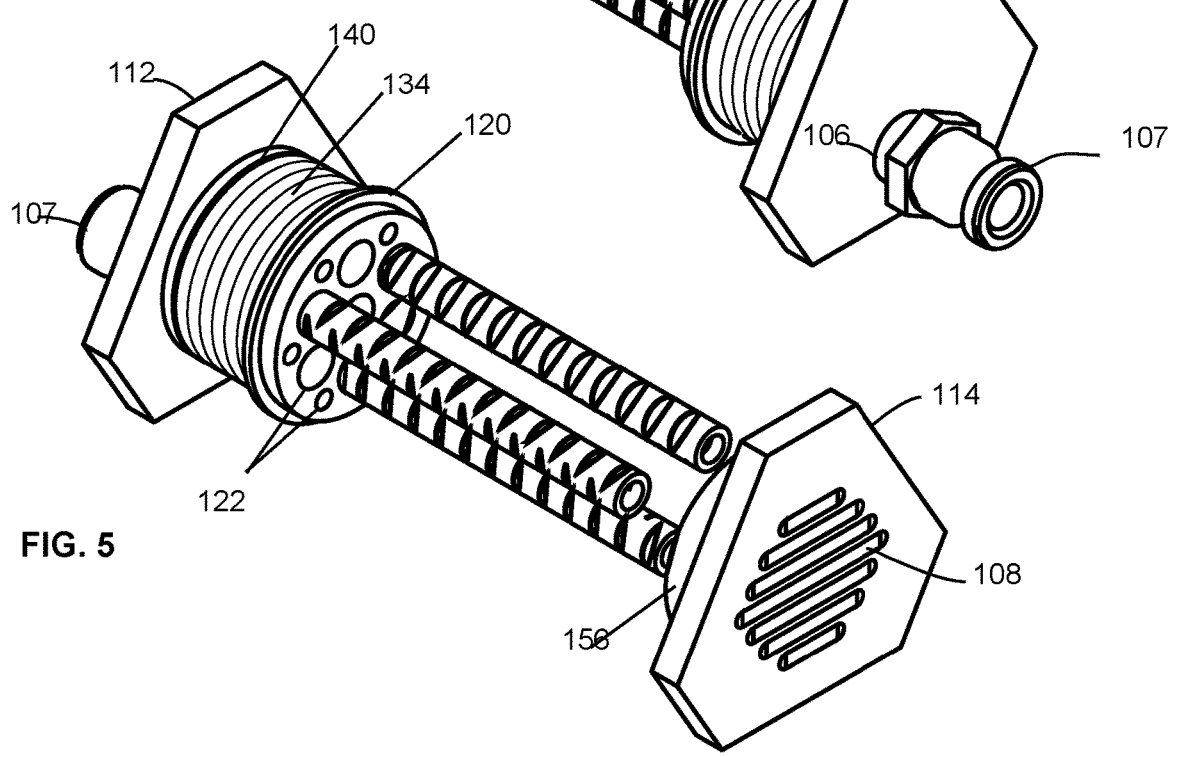
FIG. 5. is a perspective view of the internal structure shown from the outlet end of the filter apparatus in FIG. 1.
Figure 6:
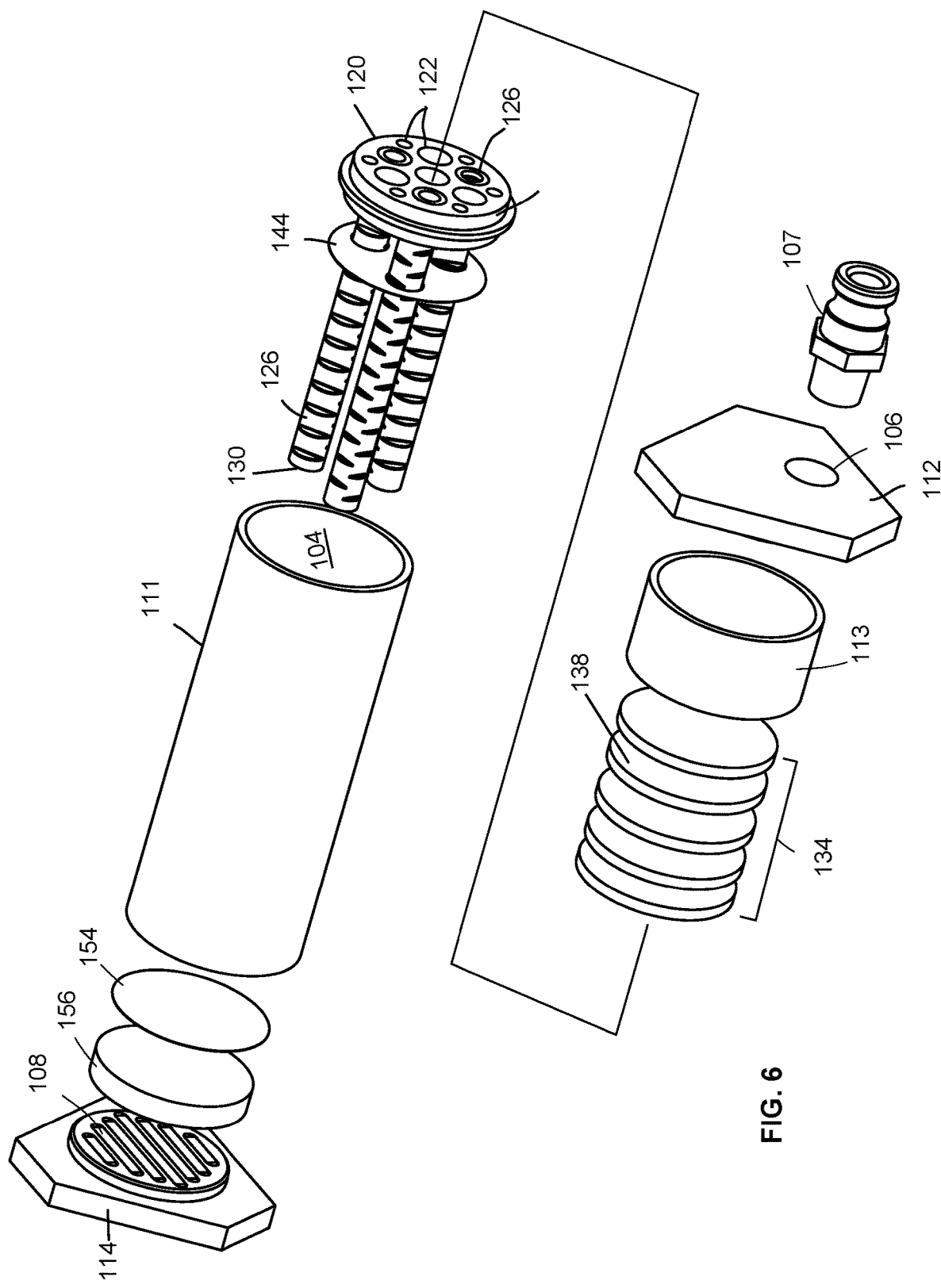
FIG. 6. is an exploded view of the filter apparatus shown in FIG. 1.
Figure 7:
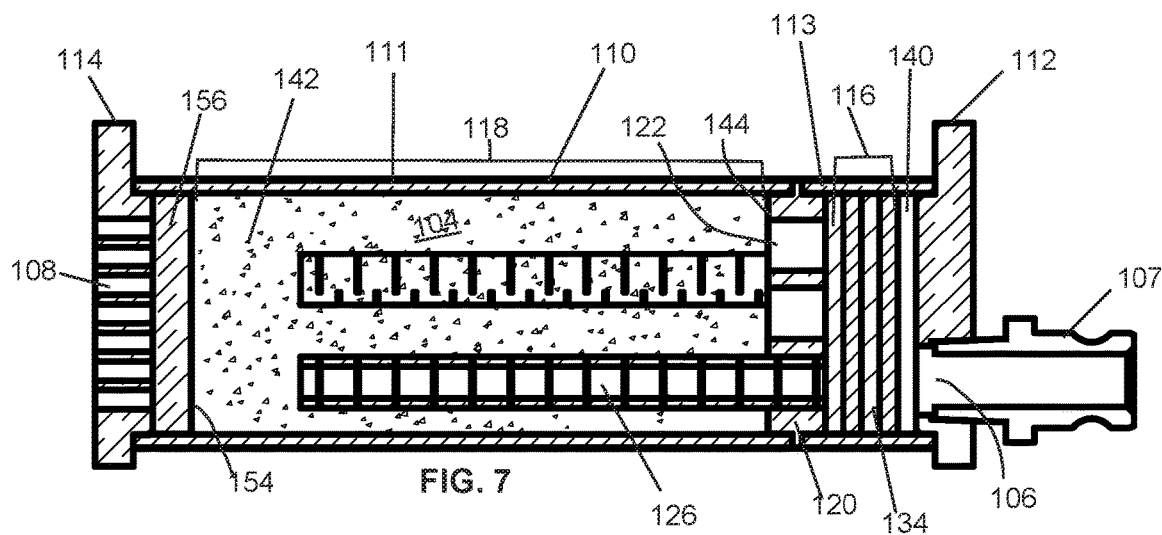
FIG. 7. is a longitudinal section of the filter apparatus shown in FIG. 3 along line B-B.
Figure 22:
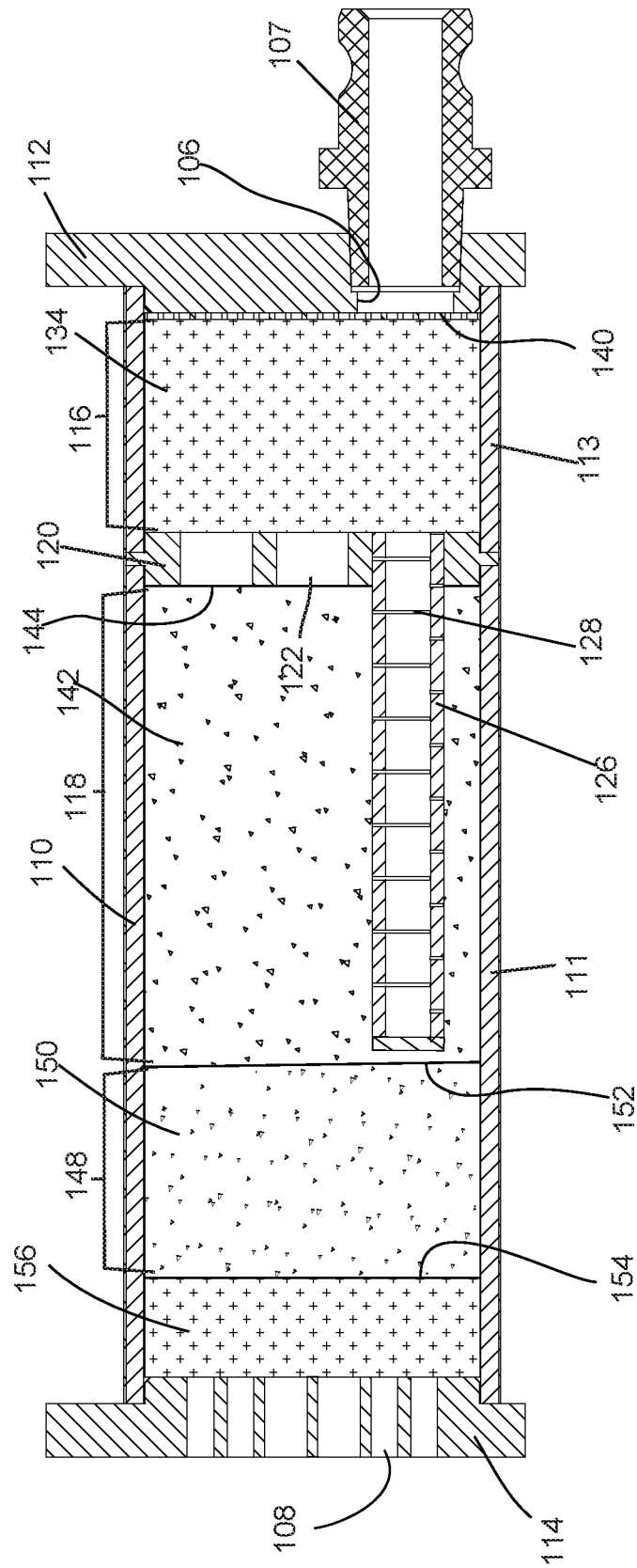
FIG. 22. is a longitudinal section of a filter apparatus in accordance with another embodiment of the present invention.

Within the first treatment zone 116 is provided a physical filtration barrier 134 that may comprise filtration floss or filter pads 138, or combination thereof. In the illustrated embodiment, the filtration barrier 134 is shown comprising of a plurality of stacked disc shaped, commercially available, filter pads 138; however, the filtration barrier may be unitary, or a combination of physical filtration barriers. The inlet 106 of the filter may be provided with a filtration screen 140 (as shown in FIGS. 5, 7 and 22) to filter out coarse particles and prevent them from entering the filter. The filtration barrier 134 filters out particles that enter the first treatment zone 116 and prevents such particles from entering the second treatment zone 118. For example, coarse grit removal filter mesh (i.e., screen) and filtration pads may be used to capture larger particulates such as sand as well as debris. The filtration pads may be made from cotton, polyester, or polyethylene or combination of these structures with different material densities (i.e., ounce/yard).

Within the second treatment zone 118 is provided a particulate filtration media 142 that is distributed throughout and substantially fills the second treatment zone and surrounds the tubes 126. Hence, liquid flowing through the second treatment zone 118 flows into and through the particulate filtration media 142 via perforations 128 of the tubes 126 as well as through any uncovered holes 122 that may be provided in the disk member 120. As will be further described herein, the filtration media 142 removes hydrocarbons and other contaminants from the liquid flowing therethrough. After the liquid flows through the filtration media 142 within the second treatment zone 118, the treated liquid exits the filter 100 via the outlet 108, and it is either discharged into the environment or it undergoes further treatment, depending on the specific environmental requirements.

A water permeable membrane 144, such as a polyester membrane, is preferably provided between the disk member 120 and the filtration media 142 to prevent particles of the filtration media 142 from entering and plugging the holes 122 or from entering the first filtration zone 116.

Figures 8, 9:
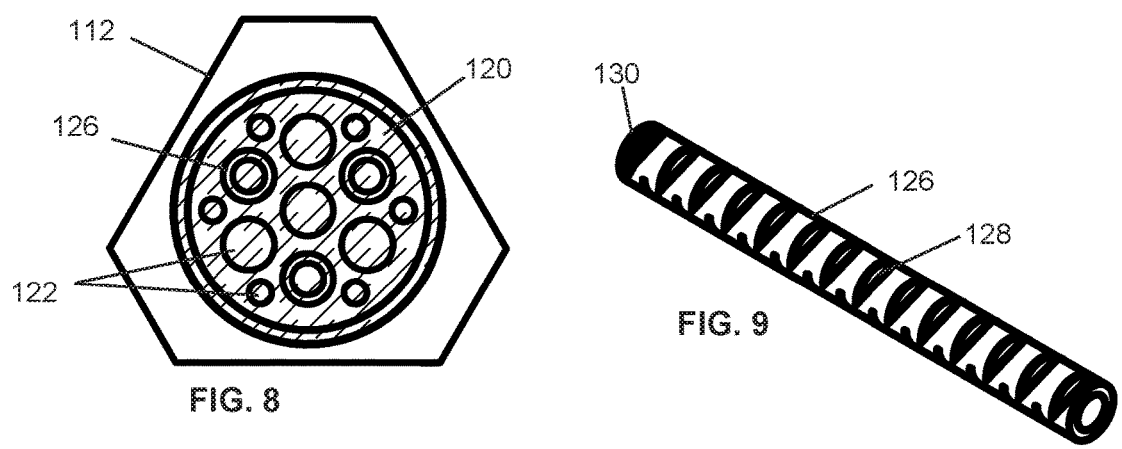
FIG. 8. is a cross-section of the filter apparatus shown in FIG. 3 along line C-C.
FIG. 9. is a perspective view of a distribution tube having slits as perforations.
Figure 10:
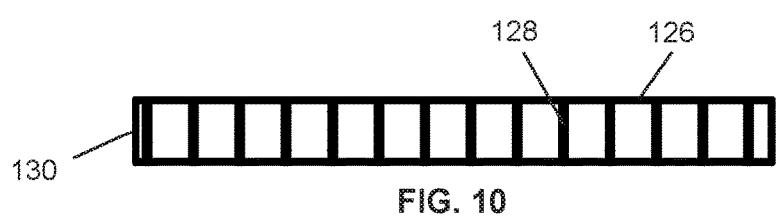
FIG. 10. is a top plan view of the distribution tube shown in FIG. 9.
Figure 11:
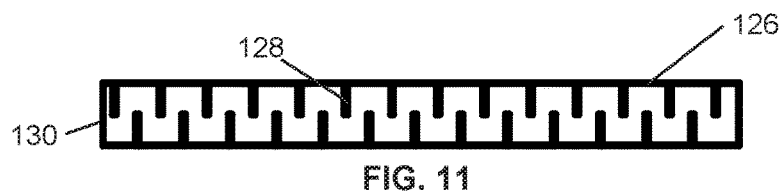
FIG. 11. is a side plan view of the distribution tube shown in FIG. 9.
Figure 12:
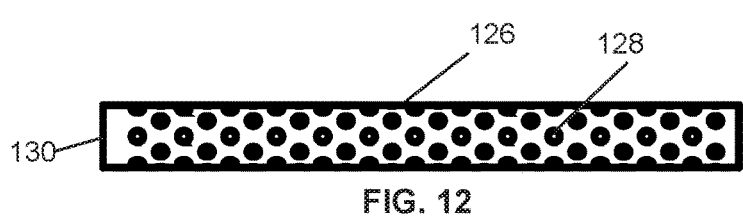
FIG. 12. is another embodiment of a distribution tube having holes as perforations.
Figure 13:
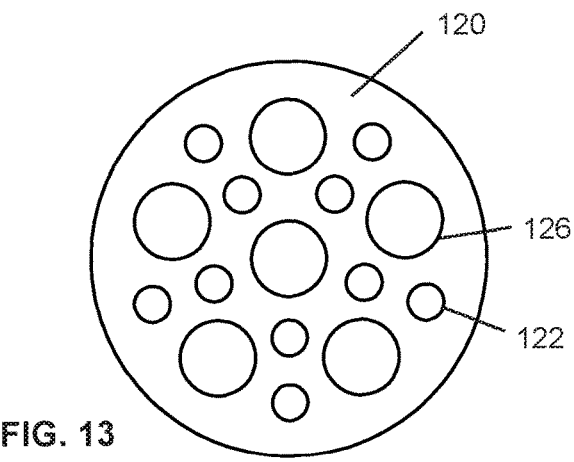
FIG. 13. is a plan view of an embodiment of a distribution disk.
Figure 14:
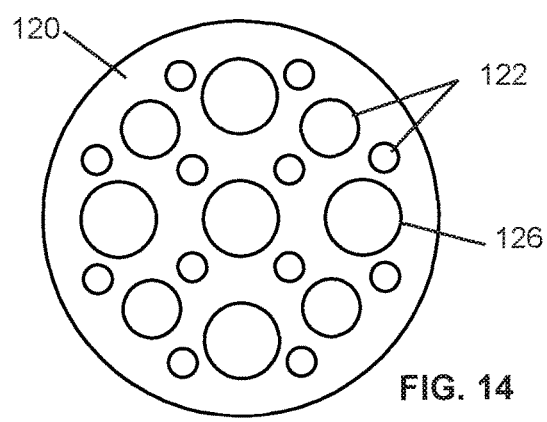
FIG. 14. is a plan view of another embodiment of a distribution disk.
Figure 15:
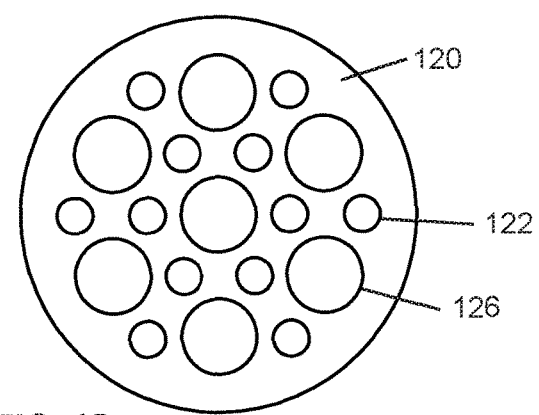
FIG. 15. is a plan view of another embodiment of a distribution disk.
Figure 16:
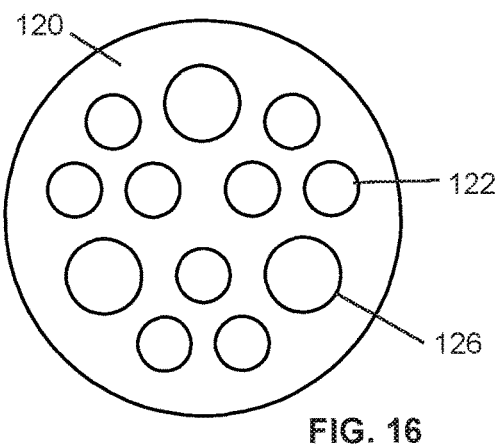
FIG. 16. is a plan view of another embodiment of a distribution disk.
Figure 17:
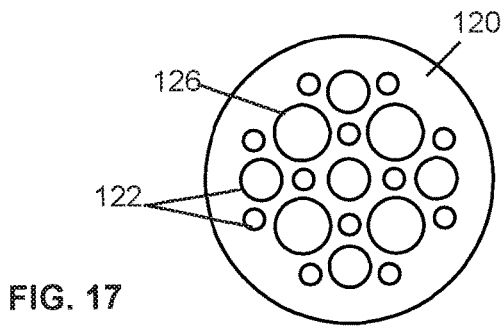
FIG. 17. is a plan view of another embodiment of a distribution disk.
Figure 18:
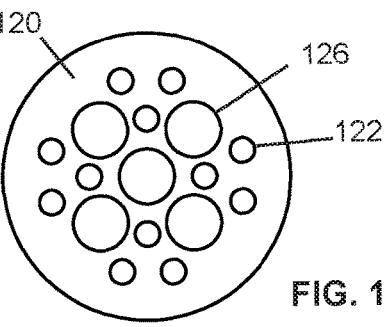
FIG. 18. is a plan view of another embodiment of a distribution disk.
Figure 19:
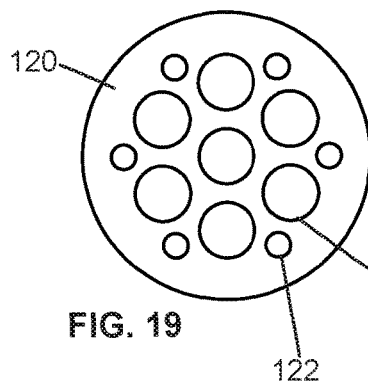
FIG. 19. is a plan view of another embodiment of a distribution disk.
Figure 20:
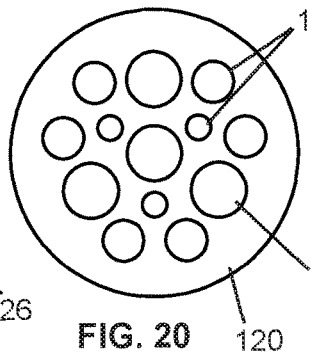
FIG. 20. is a plan view of another embodiment of a distribution disk.
Figure 21:
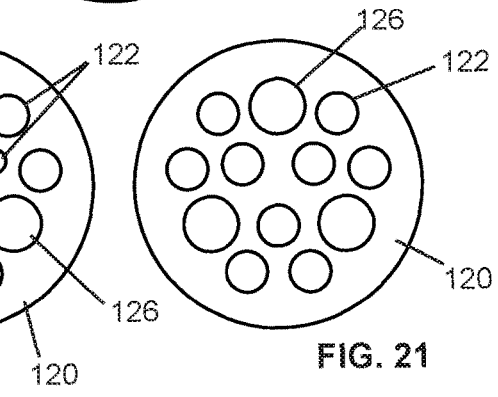
FIG. 21. is a plan view of another embodiment of a distribution disk.

The perforations 128 of the tubes 126 are preferably large enough to optimize liquid flow through the filter, but small enough to prevent surrounding particles of the particulate filtration media 142 from falling into, and thereby clogging, the tubes 126. For example, tubes 126 for use with the filtration media 142 described herein may have perforations 128 of approximately 0.02" to approximately 0.2" wide. Thus, for perforations that are small holes (for example as shown in FIG. 12) the diameter of the holes is of this size range, and for perforations that are slots (for example as shown in FIG. 9), the width of the slots is of this size range. The perforations 128 may be provided in varying patterns such as straight staggered or alternating slots/holes, and distanced from each other to optimize the liquid flow rate and the liquid flow distribution passing through the filter. For example, the distance between the perforations may be ¼" or greater depending on the desired flow rate and flow distribution parameters.

The filtration media 142 comprises of a mixture of particles of activated carbon and particles of polymers and copolymers comprised of any one or more of styrene, butadiene, ethylene, butylene molecules and their hydrogenated structures with various molecular weights in diblock, triblock alternating forms and any other combination thereof in the form of linear, branched, radial molecular structure and any other combination thereof. This includes, but not limited to, styrene-butadiene-styrene (SBS), styrene-ethylene-butylene-styrene (SEBS), their hydrogenated derivatives such as styrene-ethylene-propylene (SEP), and combinations thereof. An example of a filtration media 142 is taught in U.S. Pat. No. 5,767,060 issued on Jun. 16, 1998 to Hanrahan, which is incorporated herein by reference.

Other embodiments of the filtration media 142 may be made by initially mixing and wetting an amount of activated carbon from a specific size range, preferably in the range of 6-25 mesh size, with a bonding agent/adhesive, such as an aliphatic resin, an acrylic binder, or an aquatic-based adhesive chemical. The copolymers (polymer mixtures as described earlier) with a particle size range of 4-35 mesh size are gradually added to and mixed with the pre-wetted activated carbon along with certain amount of the bonding agent (adhesive) that is further added to reinforce the bonds between polymer-activated carbon and polymer-polymer particles. The final mixture is then transferred to a container and left to cure and air dry.

The proportional weight (or volume) of activated carbon and polymers can vary (from 100-0%) depending on the desired application (e.g., flow rate, targeted hydrocarbon for removal). An example of a filtration media 142 comprises of about 30 wt. % activated carbon and about 70 wt. % of a blend of equal portions of SBS, SEBS, and SEP copolymers described above, or a blend equal portions of SBS and SEBS. The average particle size of the activated carbon and copolymers are 6-10 mesh and 4-35, respectively. The copolymer blend is comprised of at least two copolymers from SBS, SEBS, and SEP components with an average particle size of about 25-35, about 4-6, and about 4-6 mesh, respectively.

The mixture of the polymers is blended with activated carbon to capture sheen and dissolved hydrocarbon (in addition the pure hydrocarbons, such as diesel and transformer oil), and also to facilitate the liquid transport within the polymers and the media thereby increasing the overall flow rate as well as the capacity for hydrocarbon uptake.

The mixing method described above creates a homogenous and physically stable mixture wherein the polymer particles and the activated carbon particles do not physically separate as result of their opposite electrostatic charges. The polymers and activated carbon may be in various particle sizes and physical forms, such as fine powder and fluffy.

When the copolymers come into contact with hydrocarbon molecules, the non-styrenic portion of their molecular structure partially dissolves in the hydrocarbon, creating a soft tacky adhesive gel that starts to bond with the surrounding particles (whether polymer or activated carbon). Consequently, as the uptake of hydrocarbon continues, the "gel" zone extends through the filter radially and axially, thereby limiting the passage of more fluid. Once the entire polymer fraction of the media exposed to the hydrocarbon containing fluid is saturated with hydrocarbon contaminations, the filter plugs, which automatically leads to stopping the fluid flow through the filter that prevents further hydrocarbon containing fluid to exit. It should be noted that the structure of the polymer (in particular the molecules, molecular weight) as well as its particle size play a key role in the performance of the filter in terms of the flow rate and also its robustness in capturing the hydrocarbon molecules.

It will be appreciated by persons skilled in the art that the tubes 126 serve to distribute the liquid flow entering the second treatment zone 118 along the length of the filter 100. Thus, it will be appreciated that in embodiments in which the filter 100 is elongate, it would generally be preferable to include at least some tubes 126 to achieve an even distribution of the liquid flow throughout second treatment zone 118.

Downstream from the second treatment zone 118 may be provided a filter barrier such as filter pad 156 and a water permeable membrane 154 that separates the primary filtration media 142 from the filter pad 156. The filter pad abuts the end plate 114. Alternatively, if filter barrier or pad 156 is omitted, then preferably water permeable membrane 154 is provided for preventing particles of the primary filtration media 142 from being expelled from the outlet 108 of the filter. After the liquid is treated in the primary filtration media 142, the treated liquid passes through the membrane 154, and the filter barrier or pad 156 if one is provided, and exits the filter via the outlet 108.

Referring to FIGS. 13-21, there are shown some examples of embodiments of distribution disk 120 with varying patterns of holes 122 and distribution tubes 126 on the disk 120. It will be apparent to persons skilled in the art that the number and distribution of the tubes 126 and holes 122 will affect the flow rate and the flow distribution through the filter. For example, with a larger number of slotted tubes the available volume for the media decreases, which in turn adversely affects the total capacity of the filter for hydrocarbons. Also, symmetric distribution of tubes on the distribution disk would facilitate a homogeneous distribution of fluid within the filter. It will be also apparent to persons skilled in the art that larger filters may require more holes 122 and/or distribution tubes 126 to achieve an even distribution of the liquid flow through the filtration media 142 in the second treatment zone 118. As well, in some embodiments, all holes 122 may each communicate with a tube 126 such that all liquid flowing through the holes 122 would flow through the tubes 126, whereas in other embodiments some of the holes 122 may remain uncovered and some of the holes may be provided with a tube 126. The number, arrangement, and configuration of the holes 122 and distribution tubes 126 has an effect on the distribution of the liquid flowing through the filter media in these parameters may be adjusted depending on the desired flow characteristics.

With reference to FIG. 22, some embodiments of a filter in accordance with the present invention may include a third treatment zone 148 downstream of the second treatment zone 118, depending on the hydrocarbon that is targeted for removal from the contaminated water. The third treatment zone 148 includes a secondary particulate media 150 to further treat the liquid exiting the second treatment zone 118. The third treatment zone 148 may be separated from the second treatment zone 118 by a water permeable membrane 152, such as a polyester membrane, that maintains a physical separation between the filtration media 142 and the secondary filtration media 150. Liquid flowing through the second treatment zone 118 passes through the water permeable membrane 152 and into the third treatment zone 148 to be further treated by the secondary filtration media 150. Downstream from the third treatment zone 148 may be provided a filter barrier such as filter pad 156 and a water permeable membrane 154 that separates the secondary filtration media 150 from the filter pad 156. The filter pad abuts the end plate 114. Alternatively, if filter barrier or pad 156 is omitted, then preferably water permeable membrane 154 is provided for preventing particles of the secondary filtration media 150 from being expelled from the outlet 108 of the filter. After the liquid is treated in the secondary filtration media 150, the treated liquid passes through the membrane 154, and the filter barrier or pad 156 if one is provided, and exits the filter via the outlet 108.

The secondary filtration media 150 may comprise a mixture of polymers described earlier (mesh size 4-35), activated carbon (mesh size of 4-35), hydrocarbon absorbing minerals such as clay and zeolite (mesh size of 4-35), or a mixture of polymers and activated carbon, followed by a (preferably) slim polyester sheet and a polishing/filtration pad with characteristics described earlier. The polymers in the secondary filtration media 150 may be different from the polymers of the filtration media 142 to remove different hydrocarbons (i.e., hydrocarbons having a different molecular weight or numbers of carbon atoms in the molecular structure) from the contaminated water than the hydrocarbons removed by the filtration media 142. This step may be used to polish the treated water with the secondary media, ensuring its quality meets environmental and safety standards and regulations (such as for example having <15 ppm free oil and grease).

The secondary media may comprise of a mixture of polymers described earlier, activated carbon, or of hydrocarbon adsorbing minerals such as clay and zeolite, or a mixture of polymers and activated carbon, followed by a (preferably) slim polyester sheet and a polishing/filtration pad with characteristics described earlier. The polymers may be different from the ones that were used in the primary media, but the proportion between the comprising components i.e., activated carbon and polymers—are preferably different to remove different hydrocarbons from the contaminated water than the hydrocarbons removed by the primary filtration media or to further polish and capture the hydrocarbons that potentially were not removed by the primary media due to a potential insufficient dwelling time between the hydrocarbon molecules and the filtration media. For example, a lower ratio of activated carbon may be used to ensure rigorous polishing of the water by the polymers, or the activated carbon may be omitted altogether. In some examples, the secondary media contains no activate carbon and is composed of an equal portion of SBS and SEBS polymers since the polishing power and absorption strength of the polymers outperforms the media containing activated carbon.

In operation, contaminated water flows into the filter by the inlet 106 and any larger particulate matter is removed from the liquid flow by the screen 140. Smaller particulate matter that enters the first treatment zone 116 is removed from the liquid flow by the physical filtration barrier or filter pad 138. Thereafter, the liquid flows through the holes 122 in the distribution disk 120 and into the distribution tubes 126, from which the liquid flows through the slots 128 and into the filtration media 142. A large fraction of the hydrocarbons in the contaminated liquid is removed by the filtration media 142 (as described herein) and the remaining liquid flows through the liquid permeable membrane 152 into the secondary filtration media 150 in the third treatment zone 148. Here, any remaining hydrocarbons in the liquid flow are removed by the secondary filtration media 150. The liquid then flows through the water permeable membrane 154 and through filter pad 156 where any remaining small particulate matter is removed, and the resulting liquid flows out of the outlet 108 for discharge into the environment or further treatment, depending on the application of the filter 100 and the environmental regulations and standards applicable to such application.

It should be noted that the application of the filter and the type of hydrocarbon to be contained or removed (such as diesel, jet fuel, and transformer oil) may determine whether two or more filtration media are required or the amount of one or more of the media. In other words, the purpose of the secondary media is to act as a polishing and safety layer, eliminating the potential sheen hydrocarbons that might not be fully captured by the primary media. Also, the secondary media can act as a safety layer in the event of a massive spill of hydrocarbons when the filter is exposed to a large amount of fuel. Given the characteristics of the secondary media (for example, by using copolymers only) it enables the media to quickly capture the potential hydrocarbon contamination that may escape from the first media. Given the SBS and SEBS polymers used in the secondary media, it will quickly turn into a gel object thereby blocking the fuel passage. It should be noted that generally lighter hydrocarbons with smaller carbon content and/or shorter molecular chains have lower viscosity (such as diesel and transformer oil) and hence tend to travel through the media with higher velocity compared to the heavier hydrocarbon structures such as crude oil. Therefore, employing the secondary layer in cases of lighter hydrocarbon fortifies the reliability of the filter for capturing the spill and blocking the fluid passage in the event of a massive spill.

The disk member 120 may be dimensioned to conform to the internal cross-sectional dimensions of the cavity 104 so that its peripheral edges abut the internal wall of the housing 102, or the disk member 120 may be dimensioned slightly smaller to allow some liquid bypass between its peripheral edges and the internal wall of the housing 102 in embodiments requiring a higher liquid flow rate. Also, as illustrated, the disk member 120 may be stepped on both sides to accommodate and couple cylindrical subcomponents 111 and 113 into the cylindrical member 110 and divide the filter into the first and second treatment zones.

The filter apparatus in accordance with the present invention is particularly useful for filtering out hydrocarbons and contaminated water flow from pumping stations, secondary containment berms, substations, and fueling stations, and may typically measure approximately 10-40 inches in length and approximately 3-7 inches in diameter. It should be noted that the capacity of filter will depend on the circumstance under which the filter has been exposed to the hydrocarbon. For instance, relatively higher capacity (between 50-100%) is observed when a massive spill condition is experienced. That is because the reaction time between the polymers and hydrocarbon to make a gel body, and eventually solidify, plays a key role in the performance of the filter. Hence, the fluid residence time in the media (i.e. filter) should be longer than the time needed for the polymers and hydrocarbon to form a gel. As a result, when a massive spill of pure hydrocarbon enters the filter it can travel farther throughout the filter than in the typical case when a mixture of water and hydrocarbon pass through the filter. In cases where filter is exposed to a mixture of contaminated water with hydrocarbon on a non-regular basis (i.e., whenever there is rain or loading) smaller capacity is observed because the media and hydrocarbon would have enough time to react and as result gradually form solidified structures that limit and eventually block the fluid passage over the lifetime of the filter.

While specific embodiments of the invention have been described, such embodiments are illustrative of the invention only and should not be taken as limiting its scope. In light of the present disclosure, many modifications will occur to those skilled in the art to which the invention relates, and the invention, therefore, should be construed in accordance with the accompanying claims.

What is claimed is:

1. A filter apparatus for treating hydrocarbon contaminated water comprising:
    a housing defining an internal cavity and having an inlet and an outlet;
    a separating member within the internal cavity that separates the internal cavity into a first treatment zone and a second treatment zone, wherein the first treatment zone is in fluid communication with the inlet and the second treatment zone is in fluid communication with the outlet, the separating member having one or more holes therethrough for liquid flow from the first treatment zone to the second treatment zone;
    at least one distribution tube within the second treatment zone having an end enclosing at least one of said one or more holes through the separating member to accept liquid flowing through said at least one of said one or more holes, the at least one distribution tube further having a plurality of perforations along its length for distributing liquid flowing through the at least one distribution tube into the second treatment zone;
    a filtration barrier within the first treatment zone that removes particulate matter from the liquid flowing through the first treatment zone; and
    a particulate filtration media within the second treatment zone, surrounding the at least one distribution tube, comprising at least one polymer for removing hydrocarbons from the liquid flowing through the second treatment zone prior to exiting the outlet.

2. The apparatus as claimed in claim 1 wherein the at least one distribution tube includes a closed end opposite the end enclosing said at least one of said one or more holes.

3. The apparatus as claimed in any one of claims 1 and 2 further comprising a first water permeable membrane between the second treatment zone and the separating member to prevent particles of the particulate filtration media from clogging any open holes in the separating member.

4. The apparatus as claimed in claim 3 further comprising a second water permeable membrane between the second treatment zone and the outlet to prevent particles of the particulate filtration media from clogging the outlet.

5. The apparatus as claimed in claim 3 wherein the at least one polymer is selected from the group consisting of styrene, butadiene, ethylene, butylene molecules and combinations thereof.

6. The apparatus as claimed in claim 1 further comprising a second water permeable membrane between the second treatment zone and the outlet to prevent particles of the particulate filtration media from clogging the outlet.

7. The apparatus as claimed in claim 1 wherein the particulate filtration media further comprises particles of activated carbon.

8. The apparatus as claimed in claim 7 wherein the particulate filtration media further comprises a bonding agent to reinforce bonding between particles of the at least one polymer and the activated carbon, and among particles of the at least one polymer.

9. The apparatus as claimed in claim 8 wherein the at least one polymer is selected from the group consisting of styrene, butadiene, ethylene, butylene molecules and combinations thereof.

10. The apparatus as claimed in claim 8 wherein the at least one polymer is selected from the group consisting of styrene-butadiene-styrene (SBS), styrene-ethylene-butylene-styrene (SEBS), their hydrogenated derivatives including styrene-ethylene-propylene (SEP), and combinations thereof.

11. The apparatus as claimed in claim 7 wherein the average particle size of the activate carbon is about 6-25 mesh and the average particle size of the at least one polymer is about 4-35 mesh.

12. The apparatus as claimed in claim 1 wherein the at least one polymer is selected from the group consisting of styrene, butadiene, ethylene, butylene molecules and combinations thereof.

13. The apparatus as claimed in claim 1 wherein the at least one polymer is selected from the group consisting of styrene-butadiene-styrene (SBS), styrene-ethylene-butylene-styrene (SEBS), their hydrogenated derivatives including styrene-ethylene-propylene (SEP), and combinations thereof.

14. The apparatus as claimed in claim 1 further comprising a third treatment zone defined in the internal cavity between the second treatment zone and the outlet, the third treatment zone having a secondary particulate filtration media therein comprising at least one secondary polymer for removing hydrocarbons left behind in the liquid after passing through the second treatment zone.

15. The apparatus as claimed in claim 14 wherein the secondary particulate filtration media differs in one or more of physical properties, chemical properties, and proportions of constituents from the particulate filtration media within the second treatment zone.

16. The apparatus as claimed in claim 14 further comprising a second water permeable membrane separating the second treatment zone from the third treatment zone.

17. The apparatus as claimed in claim 16 further comprising a third second water permeable membrane between the third treatment zone and the outlet to prevent particles of the secondary particulate filtration media from clogging the outlet.

18. The apparatus as claimed in claim 14 wherein the secondary particulate filtration media further comprises particles of one or more adsorbents selected from the group consisting of activated carbon, clay, and zeolite.

19. The apparatus as claimed in claim 1 wherein the housing defines one or more straight support edges to stabilize the housing from unwanted movement as it rests on a surface.

* * * * *